July 2, 1957  A. L. NORTH  2,797,957

COMBINED AUXILIARY PLATFORM AND TOOL CABINET FOR TRACTORS

Filed Dec. 31, 1953

INVENTOR.
Albert L. North

BY *Thos. E. Scofield*

ATTORNEY.

United States Patent Office 2,797,957
Patented July 2, 1957

2,797,957
COMBINED AUXILIARY PLATFORM AND TOOL CABINET FOR TRACTORS

Albert L. North, McCracken, Kans.

Application December 31, 1953, Serial No. 401,455

2 Claims. (Cl. 296—37)

This invention relates to accessories for tractors and the like, and refers more particularly to a combined auxiliary platform and tool cabinet for use in vehicles of the character described.

In many tractors of the type used in agricultural and construction work, two distinct and important difficulties exist. One is that in most instances, no provision is made for the storage of necessary hand tools and spare parts, and the second is that the foot platform at the rear of the tractor is situated so far below the tractor seat that it affords no support for the feet of the operator while occupying the driver's seat and further, makes it extremely difficult to operate the tractor from a standing position, as is often desirable. This latter problem is particularly manifest where the operator is of short stature, which is often the case since it is an almost universal practice on farms to make use of the children of the family as tractor drivers.

It is a primary object of the present invention to overcome the difficulties briefly outlined above by providing an accessory device for tractors which when installed serves not only to provide enclosed cabinets for the storage of tools and the like which are readily accessible to the operator, but which also serves to provide a rigid platform for the operator extending from fender to fender below and behind the seat. In this connection, a feature of my invention resides in the manner of installation on the vehicle, no bolts, hooks or other connections being required, thus making it possible to install and remove the device with ease and facility.

Another object of the invention is to provide a device of the above character which by virtue of its construction provides tool cabinets or boxes which are so disposed with respect to the operator as to eliminate interference with the feet and the attendant danger of causing a slip or stumble which might throw the operator from the vehicle while in motion. It is notoriously unsafe to have loose, unprotected tool boxes lying about on the floor of any open vehicle, and particularly those where during the course of operation, there is a probability that the operator will often leave his seat for one reason or another while the vehicle is in motion.

A further object of the invention is to provide a combined auxiliary platform and tool cabinet in which the tool compartments are provided with doors positioned for convenient access by the operator. In this connection, a further feature of my invention resides in providing means for releasably locking the doors in closed position, the locking means being so located as to reduce the possibility of catching or snagging the operator's clothing when mounting and demounting from the vehicle.

Still another object is to provide a device of the character described which is simple in construction, foolproof in operation, and economical to manufacture.

Other and further objects, together with the features of novelty appurtenant thereto, will appear in the course of the following description.

In the accompanying drawing, which forms a part of the instant specification and is to be read in conjunction therewith, and in which like reference numerals indicate like parts in the various views.

Figure 1:
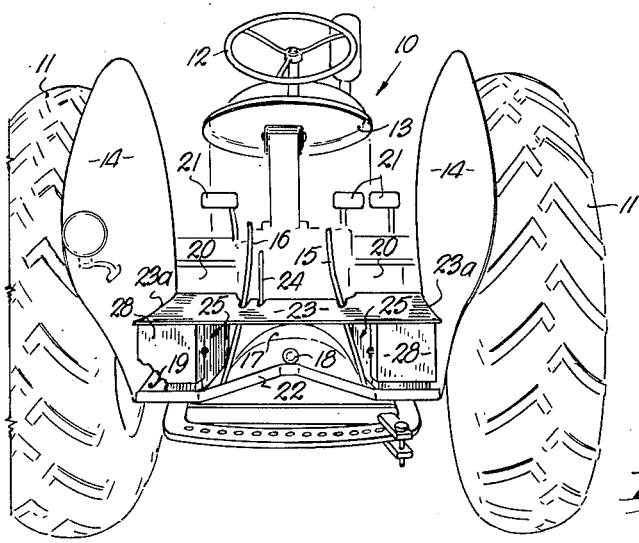
Fig. 1 is a rear view of a conventional tractor equipped with a preferred embodiment of my invention.
Figure 4:
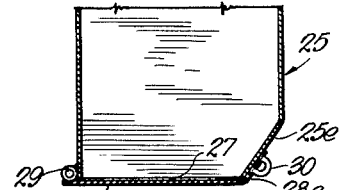
Fig. 4 is a view taken along the line 4—4 of Fig. 3 in the direction of the arrows.

Referring to the drawing, and more particularly to Fig. 1, reference numeral 10 indicates generally a conventional tractor having rear wheels 11, steering wheel 12, and a seat 13 for the operator. On each side of the seat 13 are located protective fenders 14, which are slightly curved fore and aft to present a concavity into which the respective wheels 11 are slightly recessed, as shown. Rearwardly extending guard plates 15 and 16 are located under the seat 13, and a flaring hood or housing 17 extends rearwardly between the plates 15 and 16 to cover the power take-off shaft 18. On each side of the hood 17 are located the level areas 19 which form the steps for the operator, the steps extending forwardly to the vertical walls 20 adjacent the foot pedals 21. At the rear of each step 19 is an upwardly projecting lip formed by the ends of a cross member 22 secured to the fenders 14 at its ends.

It will be understood, of course, that the tractor itself forms no part of the present invention, and therefore, it will not be described in further detail.

Figure 2:
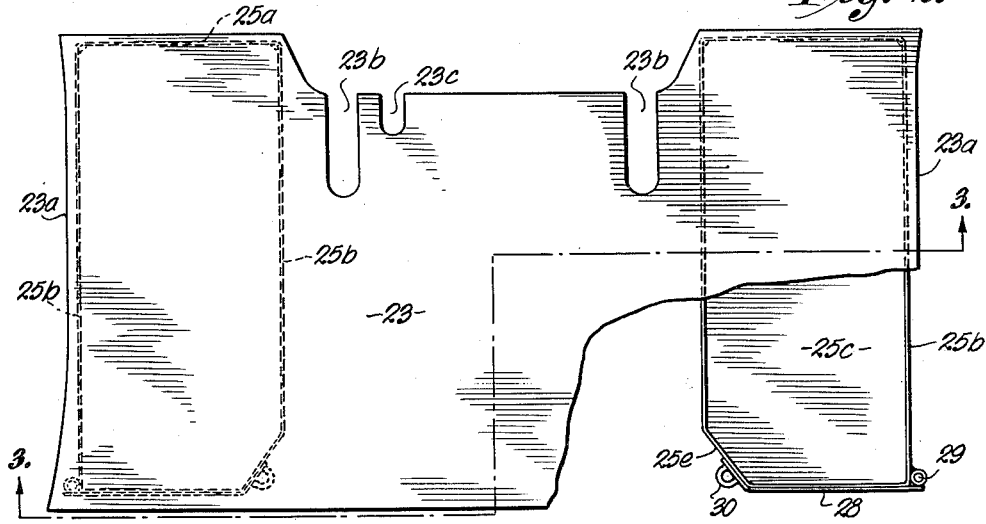
Fig. 2 is a top plan view of the preferred embodiment of the invention, part being broken away for purposes of illustration.

The main body of my invention comprises a relatively rigid, flat plate 23, preferably formed from a suitable metal sheet, which is so shaped as to span the distance between the fenders above the hood 17 and form a flat platform abutting against the vertical walls 20 at its forward edge. As is best illustrated in Fig. 2, the opposite edges 23a of the platform are provided with a curvature conforming to the curvature of the adjacent portions of the fenders 14 to provide a close fit therewith, and the forward edge is provided centrally with cut out recesses 23b which receive the guard plates 15 and 16 of the tractor in a loose fit. An additional recess 23c is also provided to receive a vertical flange 24 projecting from the frame of the tractor between the guard plates 15 and 16.

As will be evident, the recesses 23b and 23c make it possible to bring those portions of the plate 23 outboard of the tractor guard plates 15 and 16 into close abutment along their forward edges with the vertical walls 20, thus eliminating any dangerous gaps or crevices which might otherwise be present. It will be understood, of course, that the profile of the forward edge can be cut according to the structure of the particular tractor involved, the form shown in Figs. 1 and 2 being illustrative only of one preferred type.

The platform 23 is supported at each side above the level of the tractor steps 19 and the hood 17 on box-like members or cells 25 which are substantially coterminous with platform 23 and rigidly secured thereto, the central portion of the platform forming a span bridging the gap between the cells 25. Each member 25 is also preferably formed of sheet metal panels welded or otherwise secured to one another to form an open top receptacle, which is subsequently secured to the underside of the platform 23 in any suitable fashion, such as by welds 26, to form a closed compartment or cell having forward end wall 25a, sides 25b and bottom 25c. The rearward ends 25d of the compartments or cells are also partially closed, but are provided with apertures 27 having their lower edges spaced above the bottom of the compartment.

Figure 3:
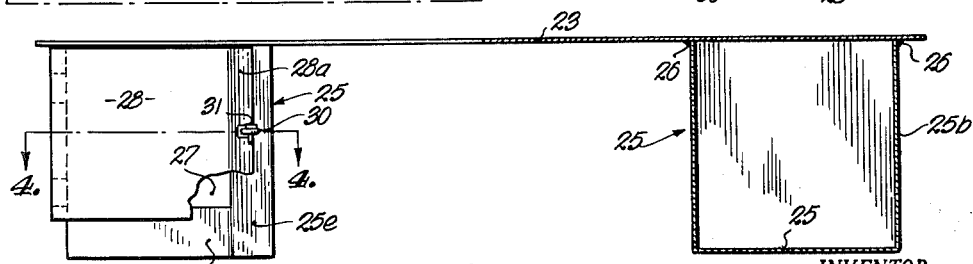
Fig. 3 is a view taken along the line 3—3 of Fig. 2 in the direction of the arrows, part being broken away for purposes of illustration.

The apertures 27 are closed by means of doors 28 which are hinged to their respective compartments along their outside vertical edges by hinge pins 29. As will be noted from Figs. 1 and 3, the lower edges of the doors 28 are spaced above the bottom 25c of the compartments so that when opened and closed, they will swing free of the lips formed by the member 22 at the rear of the tractor.

It will be noted that the inboard, rearward corners of each compartment or cell are formed as diagonal portions 25e, and that the doors 28 are provided with complementary bent edges 28a which overlap the diagonal surfaces. To releasably lock the doors 28 in closed position, hasps 30 are secured to the diagonal surfaces 25e to register with slots 28b former in the bent portions 28a of the doors and receive keepers 31. The diagonal mounting of the hasps eliminates any projections and sharp points which might otherwise snag or catch the operator's clothing, the hasps being shielded by the overlying portions of the platform 23.

From the foregoing, it will be evident that I have attained all of the objects and advantages herein set forth. The device provides a much larger, unobstructed platform area than has previously been available, and at a much more convenient location for the comfort of the operator. No screws or bolts are required to hold it in mounted position, vertical support being provided by the compartments 25 on either side. The open, box-like construction of the compartments, provides desirable storage space for tools and the like, and also, by virtue of the cellular construction, serves as a light weight support structure for the platform capable of resisting heavy loads. The curvature of the edges 23a of the platform 23, and their close, mating engagement with the fenders 11, serves to prevent longitudinal displacement of the platform in conjunction with the cross member 22.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A combined auxiliary platform and tool cabinet for tractors of the type having recessed steps on each side of the power take-off housing and upright fenders rising from the outboard edges of the respective steps, comprising a pair of box-like cells arranged to lie within and rest upon said recessed steps, said cells being of slightly greater height than the highest point on said housing and having top portions substantially parallel with said steps and coterminous therewith, a connecting span bridging the gap between said cells above said housing, said span being rigidly connected with said cells and forming with said top portions a continuous platform extending substantially from fender to fender, and an access door on each cell forming a closure for such cell at the rearward end thereof, each door being hingedly connected with its cell and movable to an open position providing access to the interior of the cell.

2. A combined auxiliary platform and tool cabinet for tractors of the type having recessed steps on each side of the power take-off housing and upright fenders rising from the outboard edges of the respective steps, comprising a pair of laterally spaced, substantially rectangular cells aligned with and arranged to lie upon said steps, the top portions of said cells being substantially coterminous with said steps and abutting along their outboard edges with the adjacent surfaces of said fenders, a connecting span between said cells overlying said housing and forming with the top portions of said cells a continuous platform extending from fender to fender and of a length substantially equal to the length of said steps, the rear edge of said platform being substantially straight, the inboard rearward corner of each of said cells being formed as a diagonal portion underlying said platform, access doors hingedly connected along a vertical axis adjacent the outboard rearward corner of each of said cells and having their free ends bent diagonally to conform with the diagonal inboard corners of the cells, and means for releasably locking said doors in closed position.

References Cited in the file of this patent
UNITED STATES PATENTS

| | | |
|---|---|---|
| D. 141,908 | Prior | July 31, 1945 |
| 1,382,279 | Foote | June 21, 1921 |
| 1,865,365 | Foote | June 28, 1932 |
| 2,181,772 | Snyder | Nov. 28, 1939 |
| 2,442,889 | Deal | June 8, 1948 |
| 2,524,206 | Orendorff | Oct. 3, 1950 |
| 2,549,129 | Pickett | Apr. 17, 1951 |